United States Patent [19]

Beckerich

[11] Patent Number: 5,357,054

[45] Date of Patent: Oct. 18, 1994

[54] ELECTRICAL CONDUIT, JUNCTION BOX AND CABLE INSTALLATION METHOD AND APPARATUS

[76] Inventor: William L. Beckerich, 6216 N. Olney, Indianapolis, Ind. 46220

[21] Appl. No.: 961,155

[22] Filed: Oct. 15, 1992

[51] Int. Cl.5 .............................................. H02G 3/26
[52] U.S. Cl. .................................. 174/48; 248/206.5
[58] Field of Search ................... 174/48, 49; 248/206.5

[56] References Cited

U.S. PATENT DOCUMENTS

| | | | |
|---|---|---|---|
| 2,721,717 | 10/1955 | Wales | 248/206.5 X |
| 3,017,036 | 1/1962 | Albert et al. | 248/206.5 X |
| 3,482,910 | 12/1969 | Debelius | 248/206.5 X |
| 3,601,521 | 8/1971 | Morton | 174/48 |
| 3,909,503 | 9/1975 | Bird | 174/48 |

Primary Examiner—Leo P. Picard
Assistant Examiner—David Tone
Attorney, Agent, or Firm—Woodard, Emhardt, Naughton, Moriarty & McNett

[57] ABSTRACT

For building electrical systems, an electrical rough-in box holding tool is magnetically attached to a rough-in box and then, with the box attached to it, the tool is magnetically attached to a steel column at a proper location to hold the box in place while the box is being secured by screws driven into the column. Steel conduit is placed against the column and magnetically held in place by a conduit holder magnetically attached to the conduit and to the column to hold the conduit in the proper location while it is clamped to the column by a clamp fastened to the column by a screw. Armored cable is passed over a smoothly contoured guide magnetically secured to bar joists, both at the cable feeding end and at a cable pulling or drop end to facilitate the pulling of the cable from a supply coil on the floor up and over one bar joist and down around another bar joist spaced from it, for connection to the conduit which is connected to the rough-in box. The box holding tool is used in different orientations to mount additional junction boxes to the underside of steel roof decking.

25 Claims, 10 Drawing Sheets

ELECTRICAL CONDUIT, JUNCTION BOX AND CABLE INSTALLATION METHOD AND APPARATUS

BACKGROUND OF THE INVENTION

1. Field of the Invention

This invention relates generally to electrical circuit installation for buildings, and more particularly to apparatus arid method facilitating the installation of conduit, junction boxes, switch boxes and cable for such installations.

2. Description of the Prior Art

Electrical circuits in building structures typically include junction boxes where conductors from several circuits are connected together, and switch boxes where circuit switches are installed. They also include cable of the armored type which is installed between the boxes and between conduits or portions thereof. Such installations are most conveniently made by two persons working together. However, it is not always possible to have two people on a given job at one time, nor is it particularly efficient in some instances. But in the case of pulling cable, particularly armored cable where it is to be introduced into a ceiling and passed over a joist and then brought down through the ceiling at a remote location, it is a very difficult task for one person. Typically it is necessary for one person to be at the supply coil end to feed the cable up over the joist, and for the other person to be at the other end pulling the cable down over a joist at that location. If a person is attempting to perform this task alone, it is necessary to employ suitably sized and located pulleys. Installation of the pulley can be difficult. It involves installing a pulley mounting chain around a joist, and padlocking it in place. It can also be difficult to keep the cable aligned with the pulley and the pulley properly situated to facilitate pulling the cable through the pulley without jamming. After cable installation, it is necessary to unpin and remove the pulley axle and wheel from the frame to get the cable out. Then remove the chain from the joist.

A further problem in connection with such electrical installations is the matter of holding a junction box on an overhead surface, or a junction box or switch box at a proper location on a column while attempting to fasten it in place. It is usually necessary to hold the box with one hand while attempting to nail or otherwise fasten the box with the other hand, somehow holding the fastener in position while a fastener hammer or screw driver is used. Another problem is the holding of conduit in a proper location while installing a clamp to secure the conduit into position against a metal column or wall stud.

The present invention is directed to facilitating the installation of electrical circuit components in building structures by one person in an efficient manner.

SUMMARY OF THE INVENTION

Described briefly, according to a typical embodiment of the present invention, a junction/switch box mounting tool is magnetically attached to a box and to a column or overhead surface at a proper location to hold the box in place while it is being secured by nails, screws, or other fasteners installed by a suitable drive tool. Conduit is temporarily held in place by an apparatus which is magnetically attached to both the conduit and to the column to hold the conduit in the proper location while the conduit is then permanently attached to the column or overhead surface by a clamp and secured to the column or overhead surface by a suitable fastener. Armored cable is passed over a smoothly contoured guide magnetically secured to bar joists, at least at the cable feeding end and, in some instances, at a remote cable pulling end, to facilitate the pulling of the cable from a supply coil up over one bar joist and down around another bar joist spaced some distance from the one bar joist for connection of the cable to the conduit, or switch box or junction box.

DESCRIPTION OF THE PREFERRED EMBODIMENT

Figure 1:
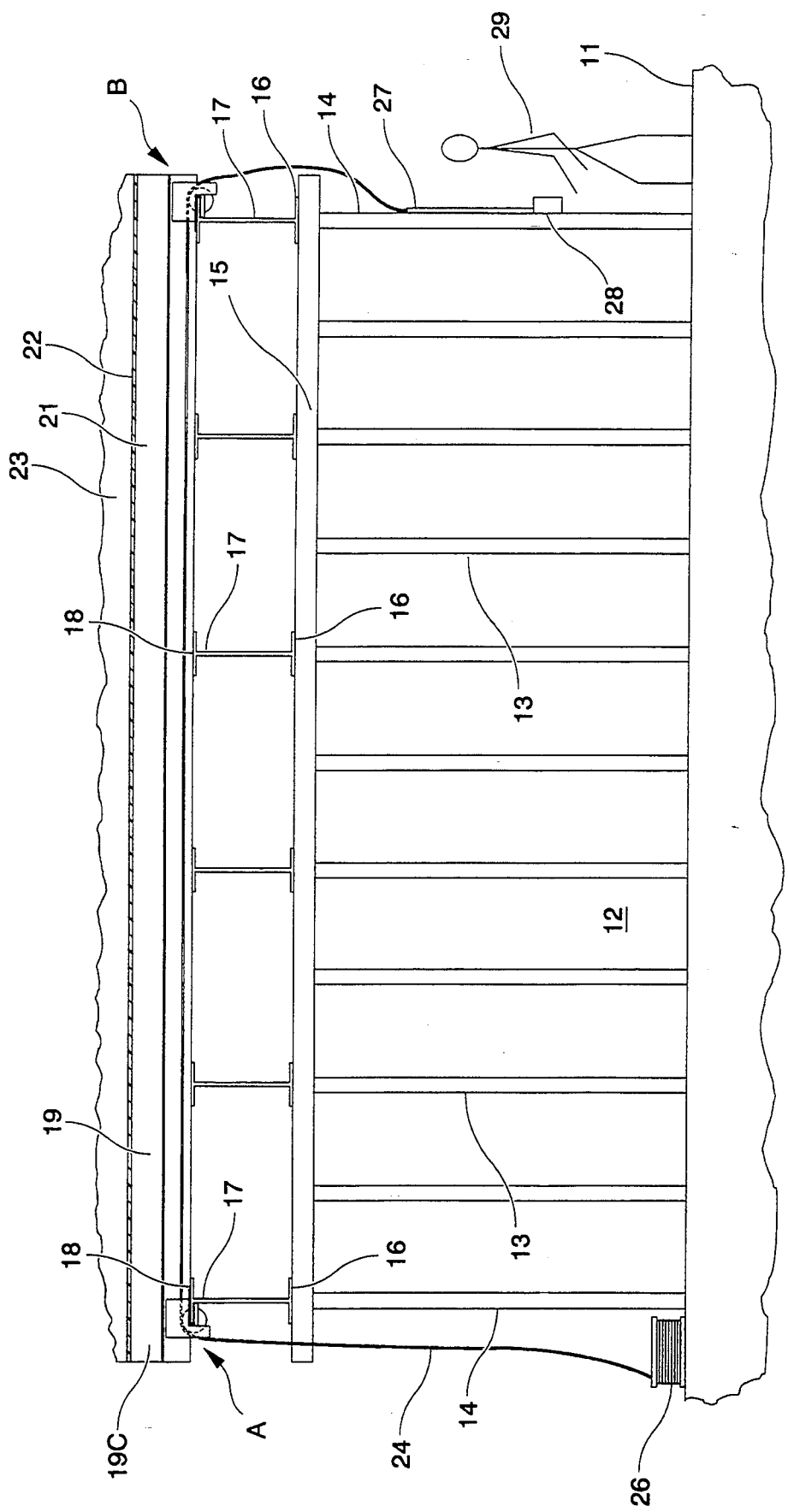
FIG. 1 is a schematic elevational view of a portion of a building structure illustrating the environment, method and apparatus of the present invention.
Figure 2:
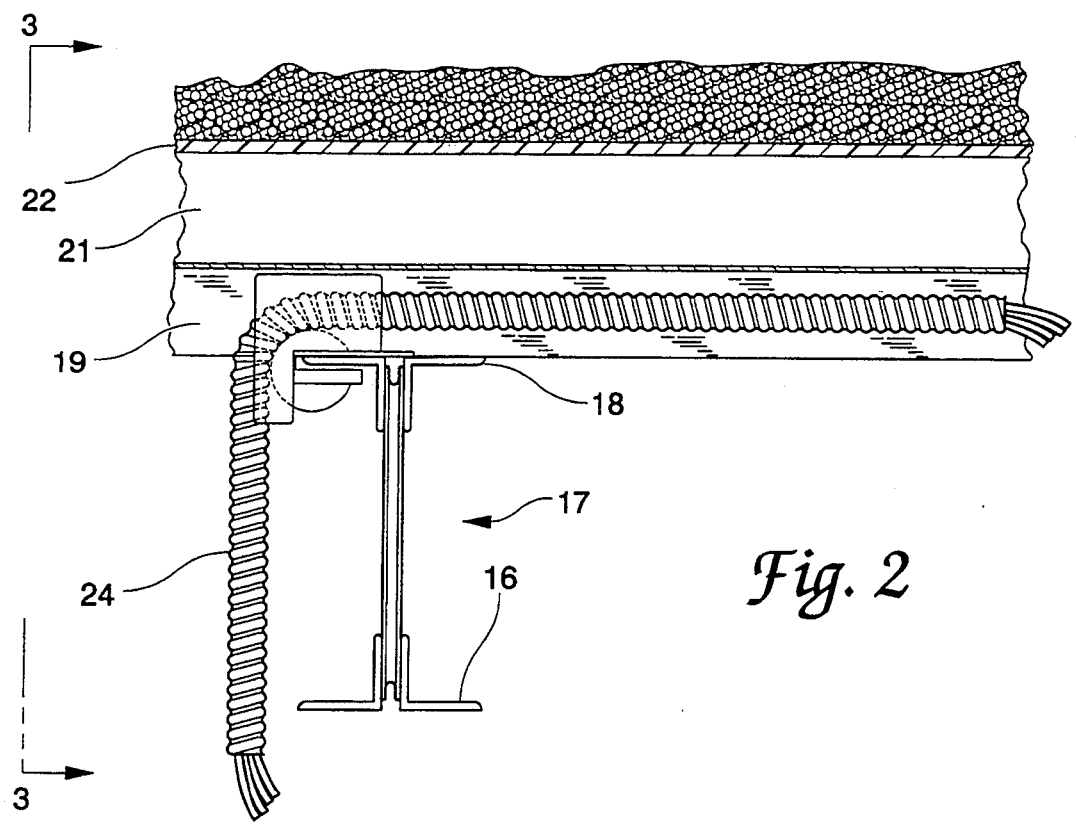
FIG. 2 is an enlarged fragmentary portion of FIG. 1 showing the guide tool where the wire from the coil turns over the top of a T-bar joist.
Figure 3:
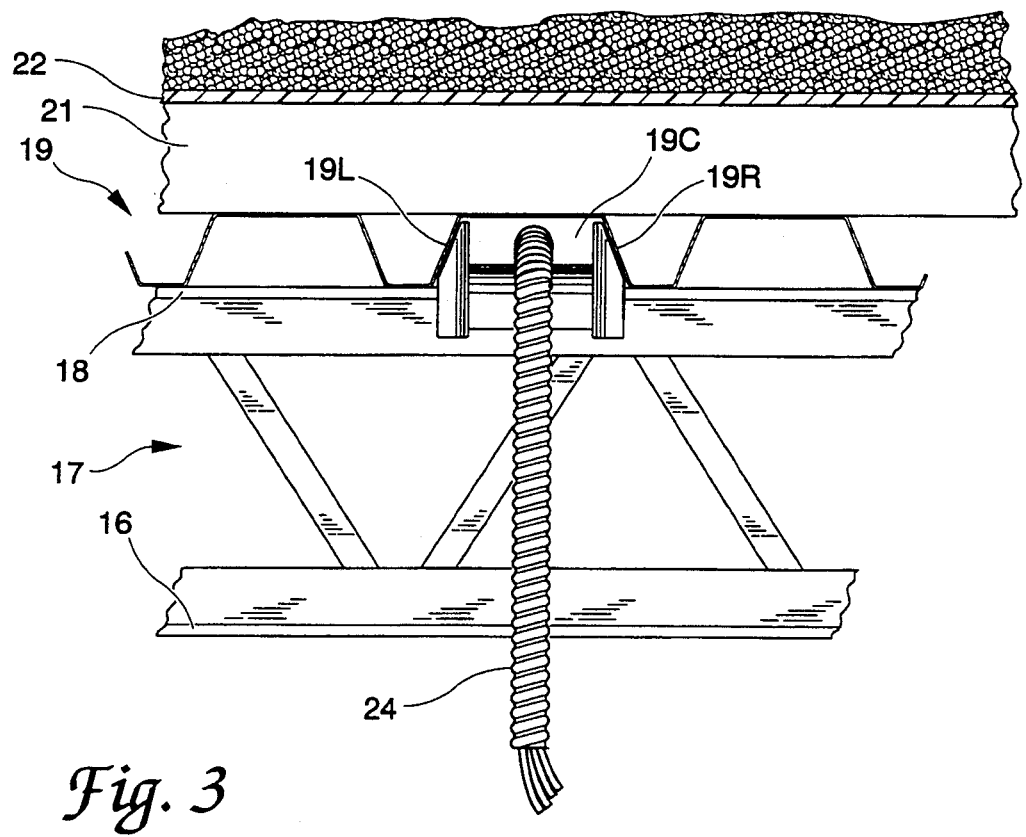
FIG. 3 is an elevational view of the structure shown in FIG. 2 as viewed in the direction of the arrows 3—3 in FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the building structure example includes a concrete floor 11 with a wall assembly 12 including a series of horizontally-spaced upstanding metal studs 13, and metal columns 14 at each end supporting a metal beam 15 at the top of the columns and supporting or, at least, in contact with the bottom flanges 16 of T-bar joists 17. The studs, columns, beam and joists are conventional structures. The joists may be, and typically are, supported additionally at their ends by beams or columns or masonry walls horizontally spaced from the wall assembly 12. The top flanges 18 of the joists 17 support corrugated metal roof decking 19. Structural and insulating foam board 21 is mounted on the decking and supports a rubber roofing material 22 with ballast 23 on top off the rubber roofing.

It is desirable to pull electrical cable 24 from a coil 26 over the top flange 18 of the left-hand joist at point A and longitudinally through the downwardly opening channel 19C formed by the roof deck, to point B at the right-hand joist 17 for a drop through metal conduit 27 to a switch box 28 mounted to the metal column 14. The present invention is addressed to making this task easier for the workman 29.

Figure 4:
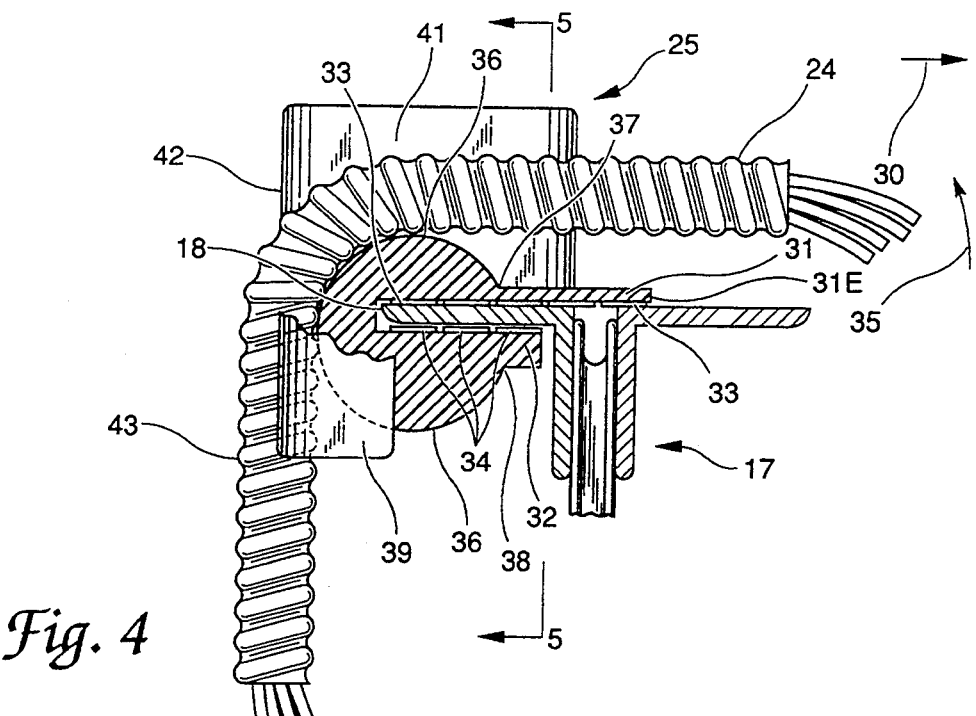
FIG. 4 is a further enlarged fragmentary view showing the guide tool mounted to the T-bar joist.
Figure 5:
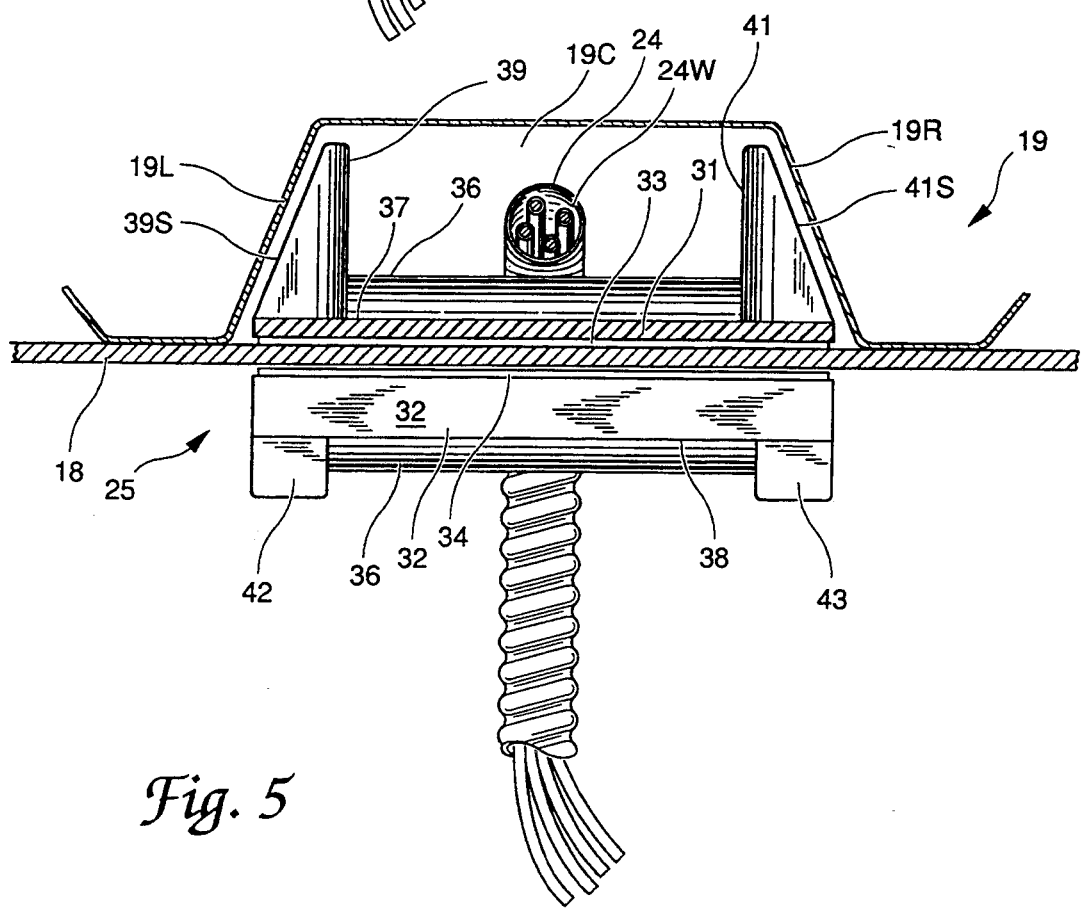
FIG. 5 is an elevational view thereof taken at line 5—5 in FIG. 4 and viewed in the direction of the arrows and showing some roof decking and the cable being pulled.

Referring now to FIGS. 4 and 5, the guide tool 25 of the present invention includes parallel mounting walls 31 and 32 providing a channel between them and which is received on the top flange 18 of the top bar of the T-bar joist 17. The lower face of wall 31 has a series of magnetic strips 33 on it. The upper face of wall 32 has a series of magnetic strips 34 on it. These strips extend the full width from the left-hand end to the right-hand end (FIG. 5) of the walls 31 and 32. There is a curved, part cylindrical surface 36 which extends from a line 37 on top of the wall 31 up and around behind and under the wall 32 to a line 38 on the bottom of wall 32. There is a cable lateral guide system including guide wall portions 39 and 41 at each side of this surface 36 adjacent the top wall 31, and which include rounded cable-entry portions 42 and 43 extending the full height of the guide system at each side of the surface 36. The outboard margins of the wall portions 39 and 41 are sloped as at 39S and 41S so that the tool fits comfortably within the downwardly opening channel 19C between the walls 19L and 19R in this portion of the corrugated roof decking 19. The illustrated cable 24 for example is an armored cable with four insulated conductors in it. The magnetic strips 33 and 34 can be flexible magnetic strips, for example, as well known in the art and available from The Magnet Source, 607-T South Gilbert, Castle Rock, Colorado 80104. The purpose is to facilitate mounting and retention of the guide tool on the flange 18 during the placement of the cable over the top of it, and retaining the tool on the flange even if the cable tends to drop back down onto the floor at or around the coil 26. At the same time, however, the magnetic attraction is not so great as to prevent intentional removal of the tool from the flange by the electrician.

Figure 7:
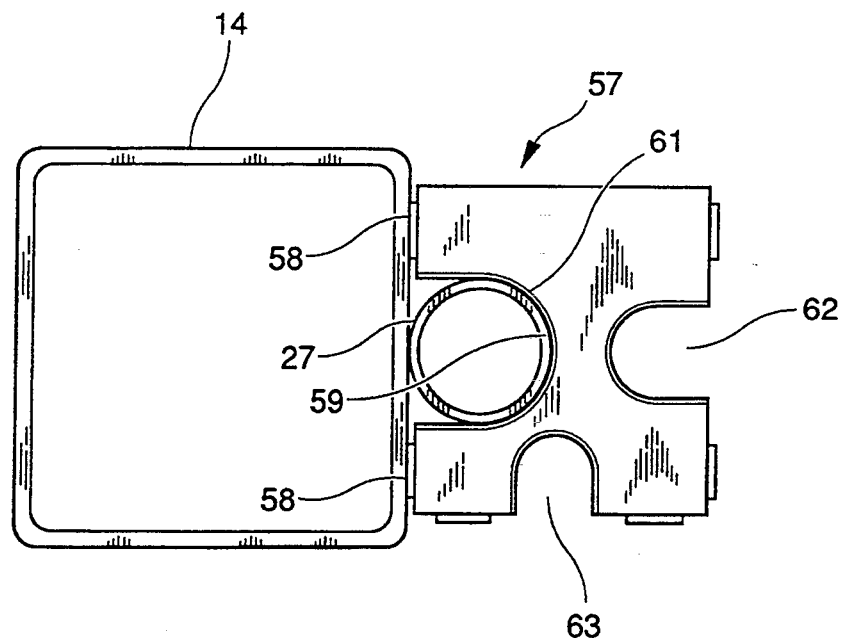
FIG. 7 is a cross section taken at line 7—7 in FIG. 6 and viewed in the direction of the arrows.
Figure 8:
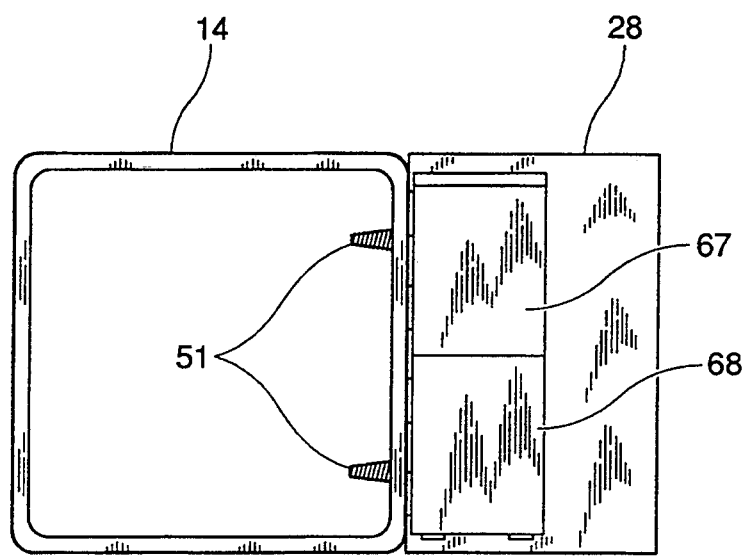
FIG. 8 is a cross section taken at line 8—8 in FIG. 6 and viewed in the direction of the arrows.

For the installation of the cable, the electrician can pull the cable up from tile coil and push it over the tool and feed it from one joist to the other in succession in whatever manner preferred, with the cable easily passing over the curved surface 36 and on to the point B where an identical guide tool can be mounted whereby the cable can be pulled down at point B by the electrician readily without assistance at point A and without the use of pulleys or other inconvenient devices prone to jamming or difficult to install. Once the cable has been pulled to the point where the electrician 29 is standing, the conduit and box 27 and 28, respectively, can be installed. For this purpose, and referring to FIGS. 6, 7 and 8, column 14 is shown as a standard square steel tube. The armored cable 24 is fastened by rigid coupling 46 to the steel conduit 27 which is fastened to the column by a clamp 47 attached to the column by a screw 48. The conduit 27 is attached to the box 28 by a connector 49. The armored shell of the conductor 24 is stripped away in or immediately below the rigid coupling 46 and the insulated conductors 24W extend down through the conduit into the box and out the front for connection to a switch assembly (not shown) to be mounted in the box. The box is mounted to the column by screws 51, for example. Prior to the actual fastening of the clamp 47 on the conduit 27 and the box 28 on the column 14, it is necessary to place those components up there and hold them in place so that the clamp 47 and screw 48 can be installed, and the screws 51 in the box can be installed. For this purpose, and according to another feature of the invention, a box holder 52 is magnetically attached to the column by magnetic strips 53 secured to the back of the box holder 52 and magnetically attached to the column 14. The box holder has a flat upper surface 54 which may have one or more magnetic strips 56 therein. When the holder 52 is attached to the column, it is manually adjusted by the workman so that the top surface 54 is in a horizontal plane at the level at which the bottom of the box 28 is to be located. Then the box is placed up against the column and permitted to slide down on top of the holder where it is then secured, freeing up both hands of the workman to install and drive screws 51 through holes in the back of the box and into the column 14.

Figure 9:
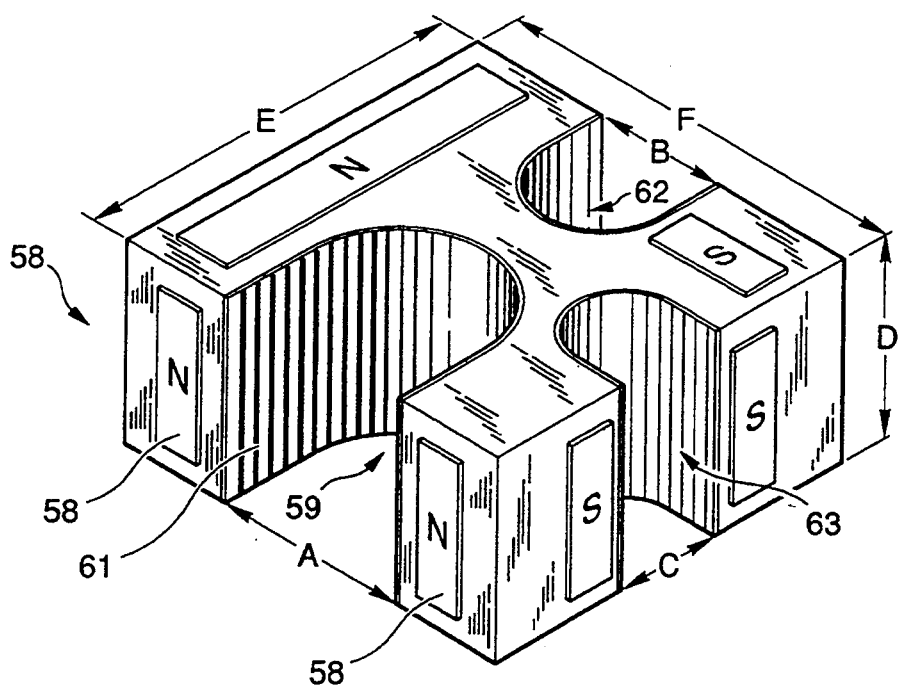
FIG. 9 is a pictorial view of the conduit holder.

The conduit 27 is placed against the face of the column and located where desired by means of the conduit holder 57. The lower end of the conduit can be mounted by the suitable connector 49 into the top of the box 28, while the upper end of the conduit is held in the proper position on the column by the holder 57, having magnetic strips at 58 (as best shown in FIG. 9) at each side of a channel 59 therein received around and holding the conduit 27 against the column to which the magnetic strips are adhering. Thus, the upper end portion of the conduit can be moved as needed to have the conduit properly situated in a vertical attitude on the column 14. Then the clamp 47 and fastener screw 48 can be placed on the conduit and the screw driven into the column 14. For additional lengths of conduit or for long lengths attached to the top of the box, additional holders 57 can be installed at selected points along the conduit to facilitate the placement and holding thereof against the column until a suitable number of clamps such as 47 have been installed.

Referring now to FIG. 9, there is an enlarged view of the conduit holder of the typical embodiment. It has three elongate channels in it for three commonly used sizes of electrical metallic tubing (EMT) or conduit which, in English dimensions, are one-half inch, three-quarter inch and one inch diameter. For this purpose, each of the faces is provided with magnets which, for illustrative purposes, are provided with legends "N" or "S". These can be magnetic strips or magnetic inserts. The purpose is to facilitate the mounting of the holder on a flat surface to which the conduit is to be fastened. Also, the channels are all lined with magnetic material as indicated so that the holder will hold onto or grip a length of conduit that is placed in the channel and support it. For use with the above-mentioned standard sizes of conduit, the dimensions of the holder and the diameter of the semi-circular wall of the various channels and across the entrance to the channels are designated by Arabic legend and, in centimeters, are as follows:

A=3.49 cm
B=2.38 cm
C=1.90 cm
D=3.50 cm
E=7.60 cm
F=7.77 cm

This holder will also hold AC armored cable in a range of sizes from 14/2 through 6/4. This will facilitate strapping cable to a column or other surface, because the holder can be used not only on columns, but also on metal members situated at any angle from vertical to horizontal.

In the particular illustrated example where the holder 57 is securing the conduit 27 to the column, the conduit is received in the channel 59 and held there by the magnetic strip liner 61 with the holder being held to the column by the Alnico magnets 58. After the conduit is clamped as by clamp 47, for example, and the box is secured to the column by screws 51, for example, the box holder 52 and conduit holder 57 can be pulled off the column by the workman and moved to another location to repeat the same procedure. As suggested above, the conduit/cable holder 57 can be used in different attitudes. Similarly, also, any of the three channels 59, 62 or 63 can be used while it is in any of those attitudes. Also, it can be used on Unistrut members so that straps can be installed to secure the conduit on the Unistrut member. In addition to holding the conduit to these structural members for fastening, it can also be used to hold it for making measurements and then removal or cutting and the like.

The box holder 52 has additional utility. To better understand that with reference to FIGS. 13 through 16, it would first be helpful to refer to FIGS. 10 and 11, wherein the box holder is shown in some detail. It includes the main body portion 66, a cantilevered long tab 67, and a cantilevered short tab 68. The main body has the magnetic strips 53 thereon (FIG. 11) previously mentioned with reference to FIG. 6. On the opposite face it has essentially identical magnetic strips 69. Alnico magnets 71 are provided on face 72. It also has a magnetic strip 73 set in face 74 at the end of tab 67. It can also have magnetic strips in the opposing faces in slot 76 between the body 66 and tab 67 and in the slot 77 between the tab 67 and tab 68. Magnetic strips are generally not necessary in the slots. A bubble level 78 is set in wall 70 to assist in leveling a box such as 28 when the support is used on a column such as 14 in FIG. 6.

To facilitate use with standard boxes used in the United States, the preferable dimensions for certain features of the box holder as indicated by the Arabic letters in FIGS. 10 and 11, in centimeters, are as follows:

A=9.1 cm
B=5.5 cm
C=10.3 cm
D=3.5 cm
E=0.5 cm
F=0.5 cm
G=0.3 cm
H=4.8 cm

Figure 10:
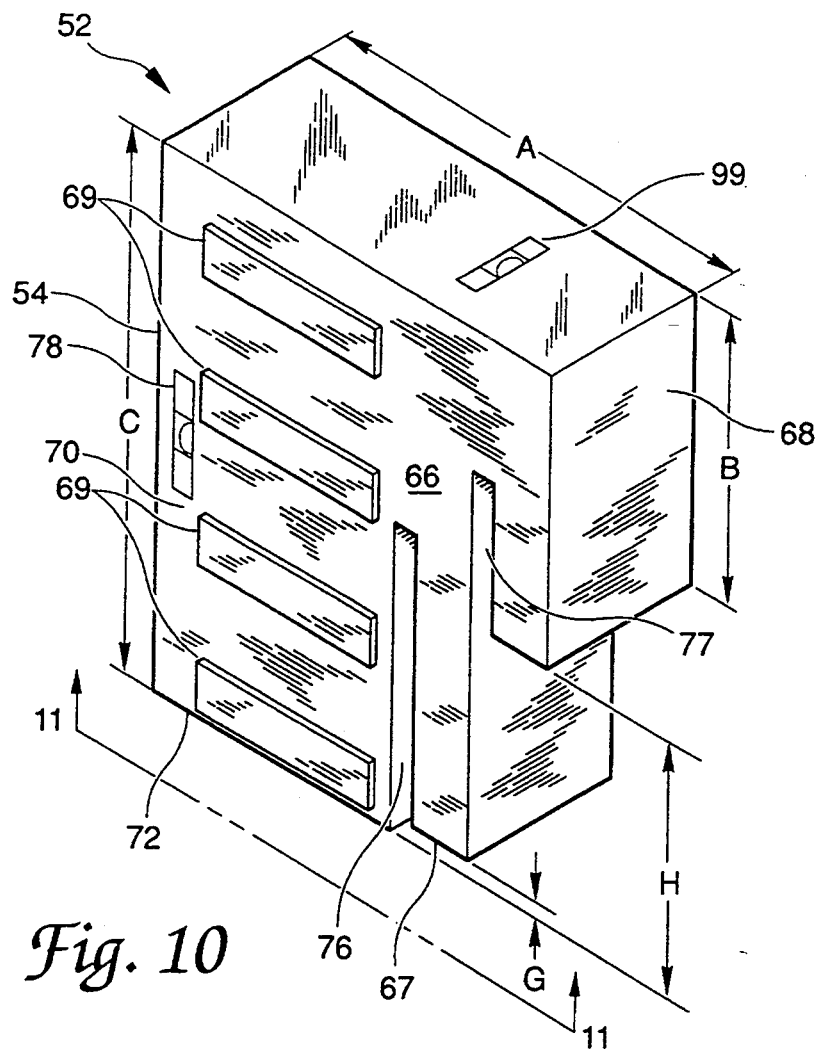
FIG. 10 is a pictorial view of the box holder.
Figure 11:
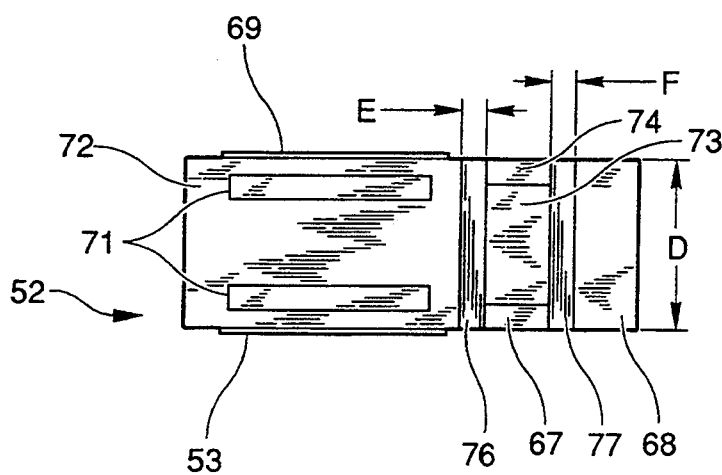
FIG. 11 is a view of the holder from the bottom of FIG. 10 looking in the direction of the arrows 11—11 in FIG. 10.
Figure 12:
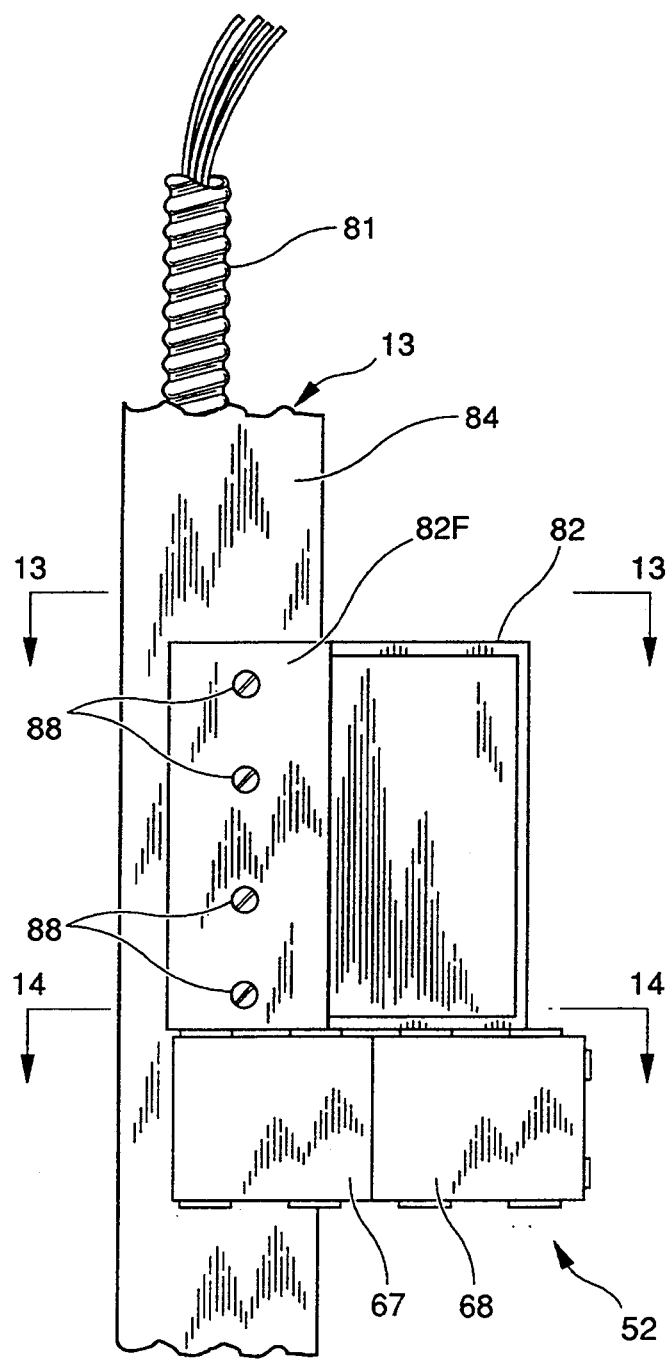
FIG. 12 is a view similar to FIG. 6 but showing the use of the box holder holding a switch box on a metal stud.
Figure 13:
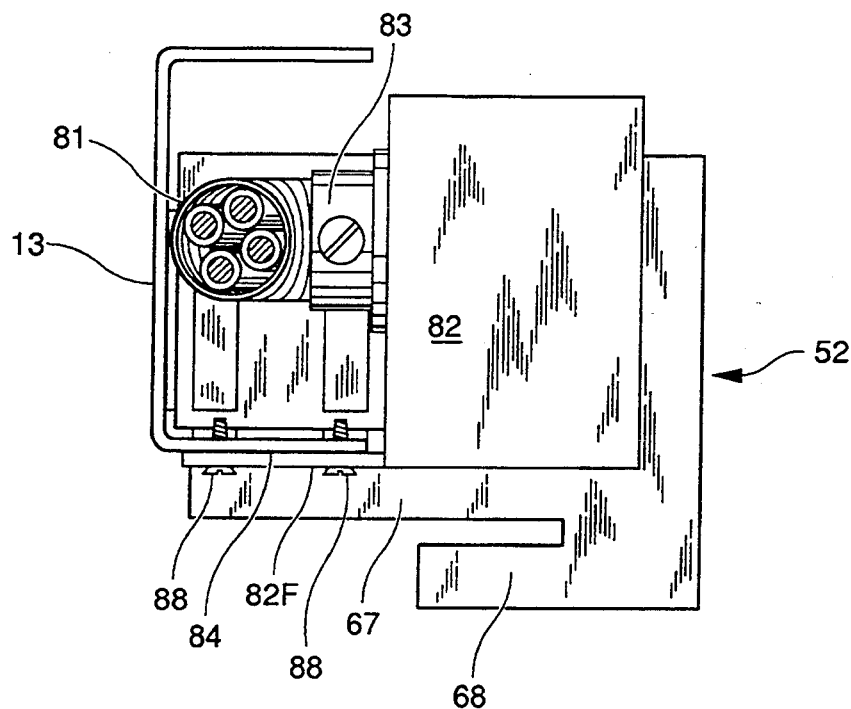
FIG. 13 is a section taken at line 13—13 in FIG. 12 and viewed in the direction of the arrows.
Figure 14:
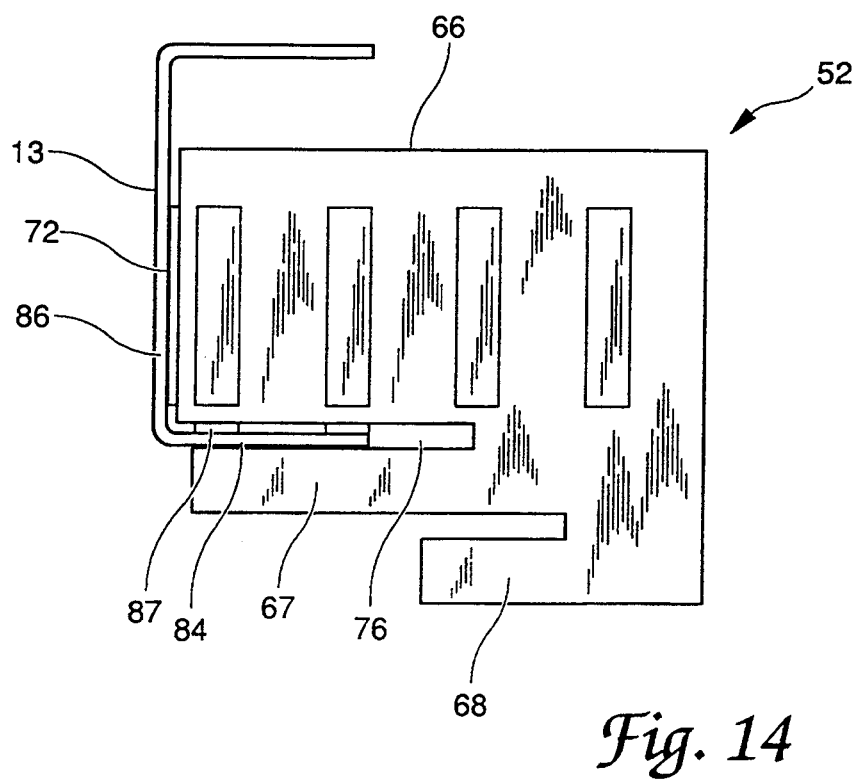
FIG. 14 is a section taken at line 14—14 in FIG. 12 and viewed in the direction of the arrows and showing the attachment of the box holder to the stud for support of the box while it is being fastened as in FIG. 13.

Referring now to FIGS. 12, 13 and 14, along with FIGS. 10 and 11, there is shown a wall stud such as 13 in FIG. 1. This is typically a channel shaped section of steel having a thin wall. In this example, multi-conductor armored cable 81 is received in the channel, and the outlet box 82 to which it is connected by the connector 83 is to be mounted to the stud wall 84. For this purpose, the box holder 52 is mounted with the body portion 66 inside the channel with the magnets 72 gripping the inside face of the wall 86 of the stud 13 and holding the holder in place on the stud. Additional support can be provided by magnetic strips 87 in the slot 76 between the main body 66 and the long tab 67 of the holder. Accordingly, the holder is secure in position in the stud. Then, the box 82 can be rested on top of the holder with the mounting flange 82F of the box engaging the wall 84 of the stud so the box can be fastened to the stud by the screws 88. Then the holder 52 can be removed from the stud, leaving the box securely in place.

Figure 15:
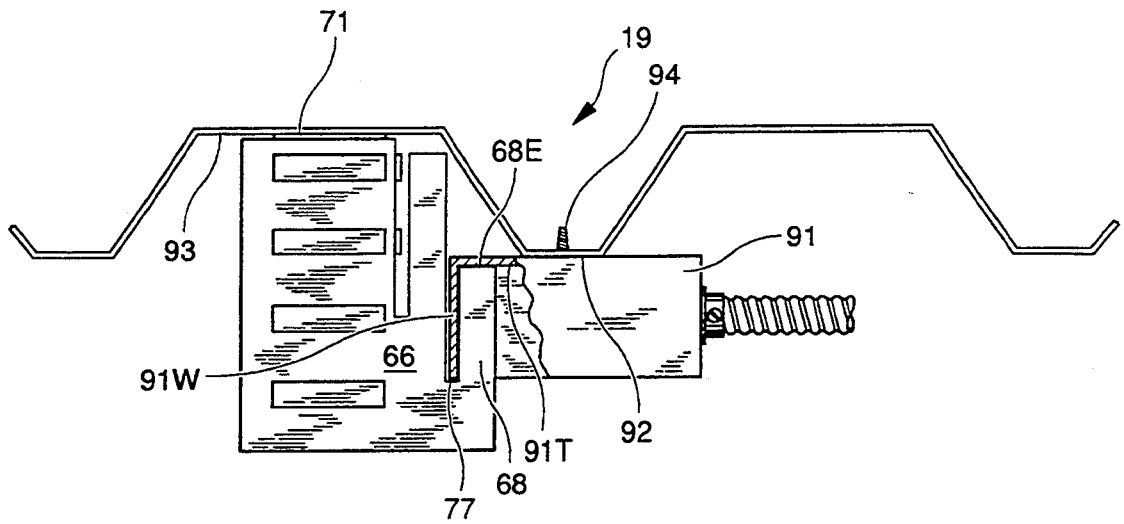
FIG. 15 is a vertical section through roof deck showing a junction box held against the downwardly facing surface of the deck by means of the box holder magnetically mounted in the downwardly opening channel of the roof deck as the box is fastened to the deck by a screw.
Figure 16:
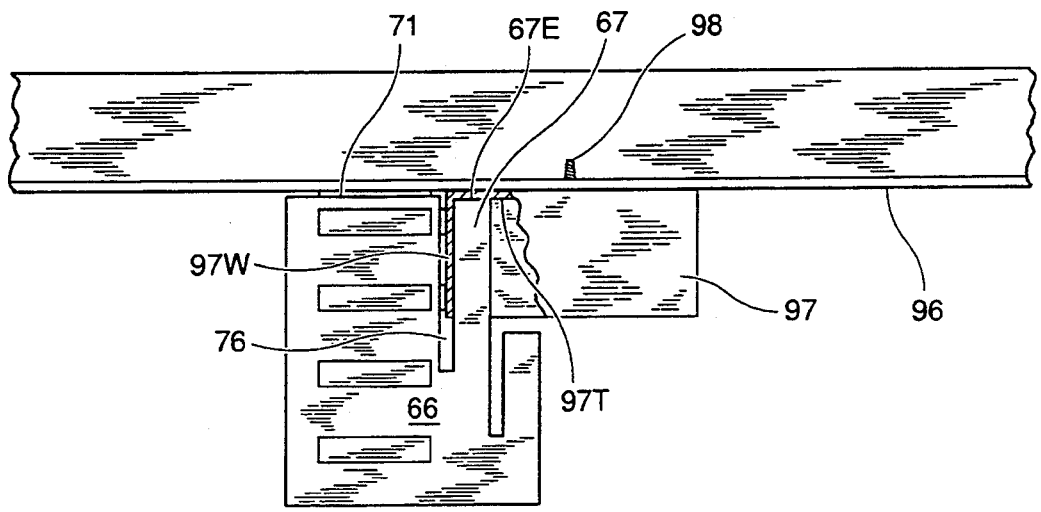
FIG. 16 is a vertical section through roof deck taken on a plane parallel to the direction of the corrugations and showing a box mounted to the downwardly facing surface of the deck held in place by the holder of the present invention which is also magnetically attached to the same surface.

FIGS. 15 and 16 show the box holder used for mounting a junction box to roof decking. FIG. 15 is an example where the junction box 91 is mounted to the bottom surface 92 of the decking at a location in the space between a couple of joists (not shown) such as joists 17 in FIG. 1, for example. In this instance, the box holder is inverted from the position shown in FIG. 10. The slot 77 opens upward and receives the side wall 91W of the box, with the tab 68 inside the box and the tab end 68E engaging the downwardly facing surface of the back wall 91T of the box. Then the box, held by the holder 66, is raised to tile position desired against the bottom 92 of the decking and the magnet 71 pushed against the downwardly facing surface 93 of the roof decking whereupon the holder 66 is held in place by the decking and, at the same time, holds the box 91 in place against the decking surface 92. Then, the workman can fasten the box to the decking face 92 by screws such as 94 screwed up through the box from inside the box and into the decking. Then the holder 66 can be removed and the box 91 remains securely in place.

In the FIG. 16 embodiment, the bottom surface of the roof decking is shown at 96 which is comparable to the surface 92 in FIG. 5 but, in this instance, the holder is mounted directly to the surface, rather than in one of the downwardly opening channels of the decking. For that purpose, box 97, which can be identical to box 91 of FIG. 15, has its side wall 97W received in the groove or slot 76 of the holder. In this case, the upper end 67E of tab 67 engages the lower face of the box back wall (top 97T) to hold the box snug up against the decking bottom 96 as the magnets 71 hold the holder tight against the decking. Then the box is secured in place by screw 98 driven up through the top of the box 97 and through the bottom 96 of the decking. Once the box has thus been fastened securely in place, the holder 66 can be pulled away and moved to the next site of use.

Figure 6:
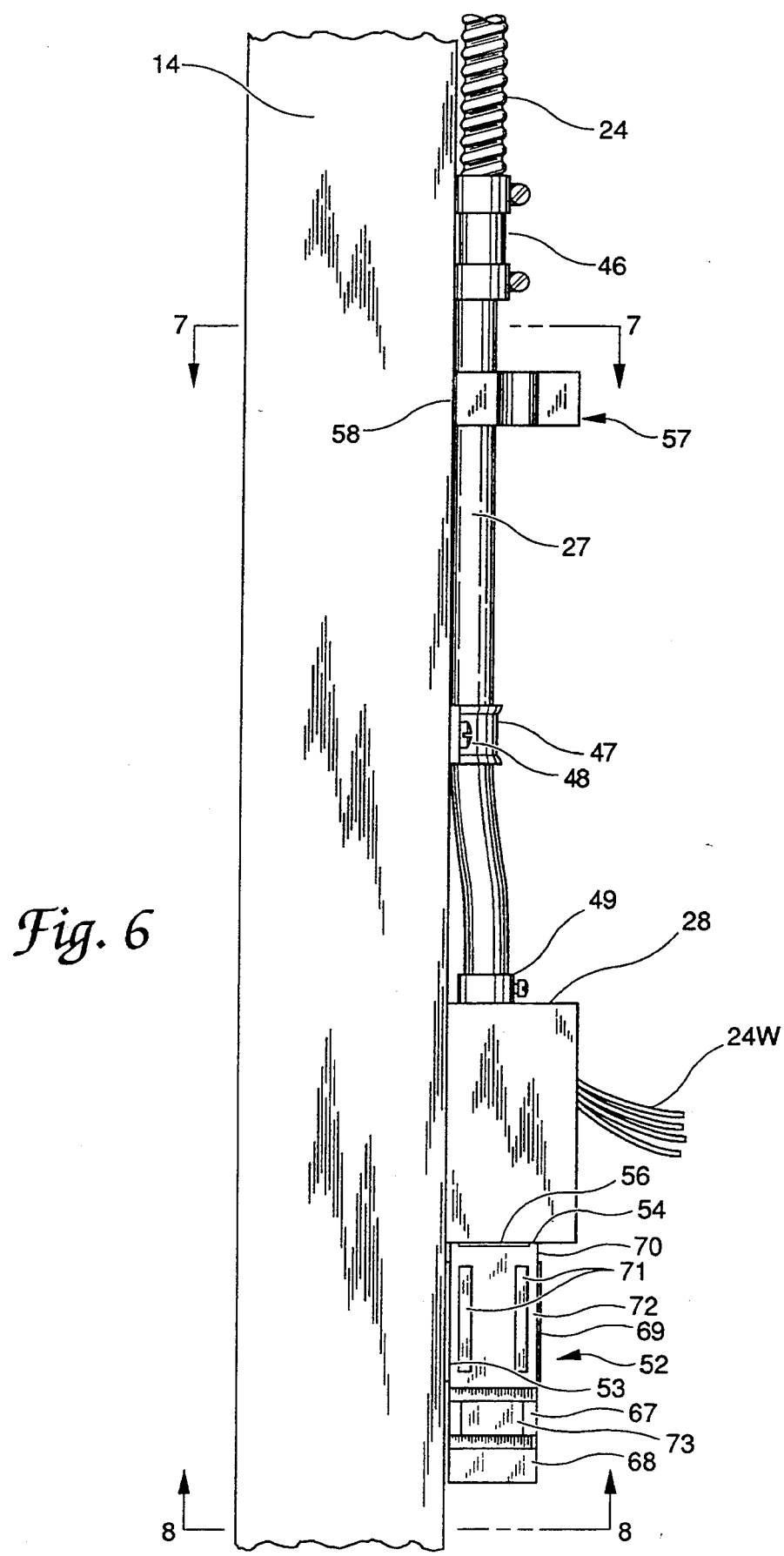
FIG. 6 is an enlarged fragmentary portion of the cable drop of FIG. 1 showing the temporary holding devices holding the conduit and switch box in place for permanent attachment to a column.

Considering the use of the box holder according to FIG. 16, and by turning FIG. 16 counterclockwise ninety degrees, it can be understood that the same relationship of box to holder and holder to supporting surface can be used to install a box on a vertical metal surface like the column 14 in FIG. 6. This may be a preferred way and, while the side wall 97W of the box is supported in the slot of the holder (which is now horizontal in this example), the built-in bubble level 99 (FIG. 10) is useful to to level up the box before screwing the back wall of the box to the column.

Referring again to the guide tool and, as an example, the overall width from the outside edges of wall 31 can be about 10 cm. The height from the tops of walls 39 and 41 to the bottom of the magnetic strips 33 can be 4 cm. The vertical spacing between the magnets 33 and 34 can be 0.5 cm. This spacing should actually be slightly greater than the thickness of the flange 18 on the angle section which is part of the T-bar joist 17. Then, and referring to FIG. 4, if the workman ceases to pull the cable in the direction of arrow 30 momentarily, and the cable tends to move in the opposite direction due to the weight hanging from the guide tool 25, the added space in the gap between the mounting walls 31 and 32 of the too]may permit the leading edge 31E of the tool to tip upward in the direction of arrow 35 and engage the cable which, due to the abutting relationship of the edge 31 with the corrugations in the cable armor cover, will resist further movement of the cable downward around the surface 36 toward the floor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of installing electrical circuiting in a building and comprising the steps of:
   temporarily magnetically attaching an electrical box to a structural member in a building at a desired location on the member;
   permanently fastening the box to the member by a fastener;
   temporarily magnetically attaching an electrical wire housing to the member at a desired location on the member;
   permanently fastening the housing to the member at the desired location; and
   pulling an electrical wiring cable up over a cable guide magnetically held to a first joist and pulling the cable horizontally to a second joist spaced from the first joist; and
   passing a portion of the cable through the housing into the electrical box.

2. The method of claim 1 and further comprising the step of:
   placing and magnetically and temporarily attaching the cable guide on a flange of the first joist;
   sliding the cable on the guide as the cable is pulled over the first joist, and laterally confining the cable to keep it on the guide during the pulling step.

3. The method of claim 2 and further comprising the step of:
   attaching the cable guide to the first joist at a location between facing wall surfaces of roof decking supported on the first joist.

4. The method of claim 1 and wherein the step of magnetically attaching the box includes the steps of:
   magnetically attaching the box to a box holder; and
   magnetically attaching the box holder to the member.

5. The method of claim 4 and further comprising the step of:
   removing the box holder from the box and the member after the box ha been permanently attached to the member.

6. The method of claim 4 and wherein the step of magnetically attaching the box to the box holder includes the step of:
   receiving a wall of the box in a slot in the box holder; and
   holding the box wall in the slot by a magnetic field established through the box wall with at least one magnet secured to the box holder at the slot in the box holder.

7. The method of claim 6 and wherein the member has a vertical surface and the box holder is magnetically attached to the vertical surface, the method further comprising the step of:
   using a bubble level in the box holder for leveling the box while magnetically attaching the holder to the member.

8. The method of claim 1 and wherein the step of magnetically attaching the housing includes the step of:
   magnetically attaching a housing holder to the member while gripping the housing with the holder to hold the housing at the desired location on the member.

9. The method of claim 8 and wherein the step of magnetically attaching the housing includes the step of:
   magnetically attaching the housing to the housing holder.

10. The method of claim 9 and further comprising the step of:
    removing the housing holder from the member and housing after the housing has been permanently attached to the member.

11. The method of claim 9 wherein the housing is a tube of ferromagnetic material and the step of gripping includes;
    receiving the tube in a channel in the holder which is of a shape and depth which, when the holder is magnetically attached to the member, clamps the tube against the member.

12. A cable guide tool comprising:
    a body having ends and having a slot therein with parallel walls facing each other and a common wall, the slot being open at the ends and the parallel wails having leading edges defining margins opposite the common wall and spaced from the common wall for reception of the body on a flange of a structural member of a building with the parallel walls on opposite sides of the flange and the common wall adjacent an edge of the flange;
    the body having a first guide surface spaced from the common wall and the slot and curving around at least a portion of one of the parallel walls and the common wall of the slot; and
    a guide at each end of the body and projecting in a direction transverse to the guide surface to provide a guideway for a cable to be freely pulled across the structural member.

13. The cable guide tool of claim 12 and wherein:
    at least one of the parallel walls includes means for establishing a magnetic field through the flange when the flange is made of a ferromagnetic material, to magnetically retain the guide tool on the flange.

14. The cable guide tool of claim 13 and wherein:
    the means for establishing include magnetic strips fixed to the one wall.

15. The guide tool of claim 12 and further comprising:
magnetic strips on the faces of the parallel walls; the strips being spaced to provide a slot width of about 1.0 cm to receive a flange in the slot between the strips and magnetically hold the guide tool to the flange.

16. The guide tool of claim 12 and wherein:
the guides are walls at each end of the body and the outside width of the body overall at the guide walls is less than 10.8 cm, but more than 5.1 cm.

17. The guide tool claim 12 and wherein:
the length of the one parallel wall from the leading edge to the common wall is at least 4.1 cm; and
the length of the other parallel wall from the leading edge to the common wall a maximum of 4.1 cm.

18. The guide tool of claim 17 and wherein:
the length of the one parallel wall from the leading edge to the common wall is 7.5 cm.

19. An electrical rough-in device holder comprising a body having:
mounting surfaces and locating surfaces;
magnets associated with the mounting surfaces such as to enable locating a ferromagnetic rough-in device against a first one of the locating surfaces while magnetically attaching a first one of the mounting surfaces to a ferromagnetic support member;
the first locating surface being a wall of a recess in the body;
at least three of the mounting surfaces being substantially planar;
at least three of the locating surfaces being recesses shaped to fittingly receive generally cylindrical electrical conductor housings in them; and
each different one of the recesses intercepting a different one of the mounting surfaces whereby a conductor housing received in one recess can be clamped against the ferromagnetic support member to which the planar surface intercepted by the one recess is magnetically attached.

20. The holder of claim 19 and wherein:
each of the planar mounting surfaces is in a plane perpendicular to at least one of the other planar mounting surfaces; and
each of the three shaped surfaces has a magnet thereon for magnetically attaching the conductor housing to the shaped surface.

21. An electrical rough-in device holder comprising a body having:
mounting surfaces and locating surfaces;
magnets associated with the mounting surfaces such as to enable locating a ferromagnetic rough-in device against a first one of the locating surfaces while magnetically attaching a first one of the mounting surfaces to a ferromagnetic support member;
the first locating surface being a wall of a recess in the body;
the first locating surface being planar and faced by another wall of the recess, thereby providing a slot in the body adapted to fittingly receive the planar side wall of an electrical rough-in box.

22. The holder of claim 21 and wherein:
the first mounting surface is planar and in a plane perpendicular to the walls of tile slot and has one of the magnets therein to magnetically attach the holder to the support member.

23. The holder of claim 22 and wherein:
the body has a second locating surface in a plane 0.3 cm from the plane of said first surface for engagement with a back wall of the rough-in box, 24. The holder of claim 23 and wherein:
the body has a second slot in a plane parallel to the first slot; and
the body has a third locating surface in a plane 4.8 cm from the plane of the first locating surface for engagement with a back wall of a rough-in box when the side wall of the box is in the second slot.

25. The holder of claim 22 and further comprising:
a bubble level in the body and oriented to show when the first locating surface is horizontal.

* * * * *